(12) United States Patent (10) Patent No.: US 12,181,629 B2
Wang et al. (45) Date of Patent: Dec. 31, 2024

(54) OPTICAL DEVICE AND METHOD OF FORMING THE SAME

(71) Applicant: Agency for Science, Technology and Research, Singapore (SG)

(72) Inventors: Zeng Wang, Singapore (SG); Jinghua Teng, Singapore (SG); Shijie Wang, Singapore (SG); Ming Yang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 556 days.

(21) Appl. No.: 17/625,065

(22) PCT Filed: Jun. 24, 2020

(86) PCT No.: PCT/SG2020/050356
§ 371 (c)(1),
(2) Date: Jan. 5, 2022

(87) PCT Pub. No.: WO2021/015668
PCT Pub. Date: Jan. 28, 2021

(65) Prior Publication Data
US 2022/0283343 A1 Sep. 8, 2022

(30) Foreign Application Priority Data
Jul. 19, 2019 (SG) .............................. 10201906719Y

(51) Int. Cl.
*G02B 1/00* (2006.01)
*G02B 5/18* (2006.01)
(Continued)

(52) U.S. Cl.
CPC ........... *G02B 1/002* (2013.01); *G02B 5/1857* (2013.01); *G02B 5/1876* (2013.01); *G02B 27/58* (2013.01);
(Continued)

(58) Field of Classification Search
CPC ....... B82Y 20/00; C01B 19/007; C01G 39/06; G02B 1/002; G02B 5/1857; G02B 5/1876;
(Continued)

(56) References Cited

U.S. PATENT DOCUMENTS

2013/0235180 A1 9/2013 Rogers et al.

FOREIGN PATENT DOCUMENTS

CN 103910340 A 7/2014

OTHER PUBLICATIONS

Lin et al. "High Performance Atomically thin flat lenses" 2016, p. 1-26. Acquired from https://arxiv.org/abs/1611.06457 (Year: 2016).*
(Continued)

*Primary Examiner* — Gerard Higgins
(74) *Attorney, Agent, or Firm* — Shackelford, McKinley & Norton, LLP

(57) ABSTRACT

Various embodiments may relate to an optical device. The optical device may include a stacked structure having a first surface and a second surface opposite the first surface. The stacked structure may include a plurality of holes or grooves extending from the first surface towards the second surface. The stacked structure may include a transition metal dichalcogenide material (TMDC) material. A thickness of the stacked structure may be of any value less than 100 nm.

19 Claims, 19 Drawing Sheets

(51) Int. Cl.
| | |
|---|---|
| *G02B 27/58* | (2006.01) |
| *G03H 1/02* | (2006.01) |
| *B82Y 20/00* | (2011.01) |
| *C01B 19/00* | (2006.01) |
| *C01G 39/06* | (2006.01) |

(52) U.S. Cl.
CPC .............. *G03H 1/024* (2013.01); *B82Y 20/00* (2013.01); *C01B 19/007* (2013.01); *C01G 39/06* (2013.01); *G02B 2207/101* (2013.01)

(58) Field of Classification Search
CPC ... G02B 27/58; G02B 2207/101; G03H 1/024
See application file for complete search history.

(56) References Cited

OTHER PUBLICATIONS

International Search Report for International Application No. PCT/SG2020/050356 dated Oct. 1, 2020, pp. 1-5.
Written Opinion of the International Searching Authority for International Application No. PCT/SG2020/050356 dated Oct. 1, 2020, pp. 1-6.
Yang et al., "Atomically Thin Optical Lenses and Gratings," Light: Science & Applications, vol. 5, Mar. 11, 2016, pp. 1-50.
Rogers et al., "A Super-Oscillatory Lens Optical Microscope for Subwavelength Imaging," Nature Materials, vol. 11, Mar. 25, 2012, pp. 432-435.
Huang et al., "Ultrahigh-Capacity Non-Periodic Photon Sieves Operating in Visible Light," Nature Communications, vol. 6, May 5, 2015, pp. 1-7.
Roy et al., "Sub-Wavelength Focusing Meta-Lens," Optics Express, vol. 21, No. 6, Mar. 25, 2013, pp. 7577-7582.
Yuan et al., "Planar Super-Oscillatory Lens for Sub-Diffraction Optical Needles at Violet Wavelengths," Scientific Reports, vol. 4, 6333, 2014, pp. 1-7.
Zheng et al., "Metasurface Holograms Reaching 80% Efficiency," Nature Nanotechnology, vol. 10, No. 4, Feb. 23, 2015, pp. 1-5.
Zhao et al., "Dielectric Huygens' Metasurface for High-Efficiency Hologram Operating in Transmission Mode," Scientific Reports, vol. 6, 30613, 2016, pp. 1-7.
Yuan et al., "Achromatic Super-Oscillatory Lenses with Sub-Wavelength Focusing," Light: Science & Applications, vol. 6, No. 9, 2017, pp. 1-8.
Yoon et al., "Pragmatic Metasurface Hologram at Visible Wavelength: The Balance Between Diffraction Efficiency and Fabrication Compatibility," ACS Photonics, vol. 5, No. 5, 2017, pp. 1643-1647.
Wen et al., "Helicity Multiplexed Broadband Metasurface Holograms," Nature Communications, vol. 6, 2015, pp. 1-7.
Huang et al., "Photon-Nanosieve for Ultrabroadband and Large-Angle-of-View Holograms," Laser & Photonics Reviews, vol. 11, No. 3, 17000235, 2017, pp. 1-9.
Lin et al., "Dielectric Gradient Metasurface Optical Elements," Science, vol. 345, Issue 6194, 2014, pp. 298-302.
Shalaev et al., "High-Efficiency All-Dielectric Metasurfaces for Ultracompact Beam Manipulation in Transmission Mode," Nano Letters, vol. 15, No. 9, 2015, pp. 6261-6266.
Wang et al., "Grayscale Transparent Metasurface Holograms," Optica, vol. 3, No. 12, Dec. 2016, pp. 1504-1505.
Devlin et al., "Broadband High-Efficiency Dielectric Metasurfaces for the Visible Spectrum," Proceedings of the National Academy of Sciences, vol. 113, No. 38, 2016, pp. 10473-10478.
Khorasaninejad et al., "Metalenses at Visible Wavelengths: Diffraction-Limited Focusing and Subwavelength Resolution Imaging," Science, vol. 352, Issue 6290, 2016, pp. 1190-1194.
Wang et al., "Electronics and Optoelectronics of Two-Dimensional Transition Metal Dichalcogenides," Nature Nanotechnology, vol. 7, No. 11, Nov. 2012, pp. 699-712.
Tan et al., "Two-Dimensional Transition Metal Dichalcogenide Nanosheet-Based Composites," Chemical Society Reviews, vol. 44, No. 9, 2015, pp. 2713-2731.
Muratore et al., "Continuous Ultra-Thin MoS2 Films Grown by Low-Temperature Physical Vapor Deposition," Applied Physics Letters, vol. 104, No. 26, 261604, 2014, pp. 1-5.
Yuan et al., "Flat Super-Oscillatory Lens for Heat-Assisted Magnetic Recording with Sub-50nm Resolution," Optics Express, vol. 22, No. 6, 2014, pp. 6428-6437.
Di Fabrizio et al., "High-Efficiency Multilevel Zone Plates for keV X-Rays," Letters to Nature, vol. 401, Issue 6756, 1999, pp. 895-898.
Saavedra et al., "Fractal Zone Plates," vol. 28, No. 12, Jun. 15, 2003, pp. 971-973.
Qin et al., "A Supercritical Lens Optical Label-Free Microscopy: Sub-Diffraction Resolution and Ultra-Long Working Distance," Advanced Materials, vol. 29, No. 8, Issue 1602721, 2017, pp. 1-6.
Slinger et al., "Computer-Generated Holography as a Generic Display Technology," Computer, vol. 38, No. 8, 2005, pp. 46-53.
G. Tricoles, "Computer Generated Holograms: An Historical Review," vol. 26, No. 20, Oct. 15, 1987, pp. 4351-4360.
Zhang et al., "Fully Computed Holographic Stereogram Based Algorithm for Computer-Generated Holograms with Accurate Depth Cues," Optics Express, vol. 23, No. 4, 2015, pp. 3901-3913.
Michael Lehmann, "Determinatoin and Correction of the Coherent Wave Aberration From a Single Off-Axis Electron Hologram by Means of a Genetic Algorithm," Ultramicroscopy, vol. 85, No. 3, 2000, pp. 165-182.

\* cited by examiner

1

PVD Growth

2

Gold Layer Deposition

3

FIB etching

4 Chemical etching off gold layer

OPTICAL DEVICE AND METHOD OF FORMING THE SAME

CROSS-REFERENCE TO RELATED APPLICATION

This application claims the benefit of priority of Singapore application No. 10201906719Y filed Jul. 19, 2019, the contents of it being hereby incorporated by reference in its entirety for all purposes.

TECHNICAL FIELD

Various aspects of this disclosure relate to an optical device. Various aspects of this disclosure relate to a method of forming an optical device.

BACKGROUND

Advances in imaging science and technology allow us to observe and display the world more finely and stereoscopically. From traditional spherical lens to planar meta-lens, the imaging resolution has been greatly improved and the Rayleigh diffraction limit is already not a 'limit' for specially designed planar meta-lens. For instance, super-oscillatory lenses could theoretically operate several times below the diffraction limit. Holography is another significant imaging technology which enables three dimensional (3D) visual viewing via precisely manipulating the light field. Recently, holographic patterns designed in nanoscale by using meta-surfaces and photon sieves have demonstrated promising performance and versatile functionalities, and demonstrate promising potential for integrated optical and photonic applications.

High efficiency manipulation of light is important in driving these advanced optical systems towards industrial applications. Metallic material is widely used in many meta-devices for its plasmonic resonance, high reflectivity and ease of nanofabrication. However, the lossy nature of metallic material results in low efficiency in the operation of transmission mode. Alternatively, low-loss dielectrics such as silicon and titanium oxide are effective in lifting the efficiency for these meta-devices, however, they can be only employed in the longer wavelength range. For shorter wavelength range (such as in ultraviolet (UV) range below 400 nm), suitable materials are needed to meet the rigorous requirements of high efficiency, broadband operation while maintaining imaging quality.

SUMMARY

Various embodiments may relate to an optical device. The optical device may include a stacked structure having a first surface and a second surface opposite the first surface. The stacked structure may include a plurality of holes or grooves extending from the first surface towards the second surface. The stacked structure may include a transition metal dichalcogenide material (TMDC) material. A thickness of the stacked structure may be of any value less than 100 nm.

Various embodiments may relate to a method of forming an optical device. The method may include forming a plurality of holes or grooves extending from a first surface of a stacked structure towards a second surface of the stacked structure opposite the first surface. The stacked structure may include a transition metal dichalcogenide material (TMDC) material. A thickness of the stacked structure may be of any value less than 100 nm.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The device as described herein may be operable in various orientations, and thus it should be understood that the terms "top", "bottom", etc., when used in the following description are used for convenience and to aid understanding of relative positions or directions, and not intended to limit the orientation of the device.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1A:
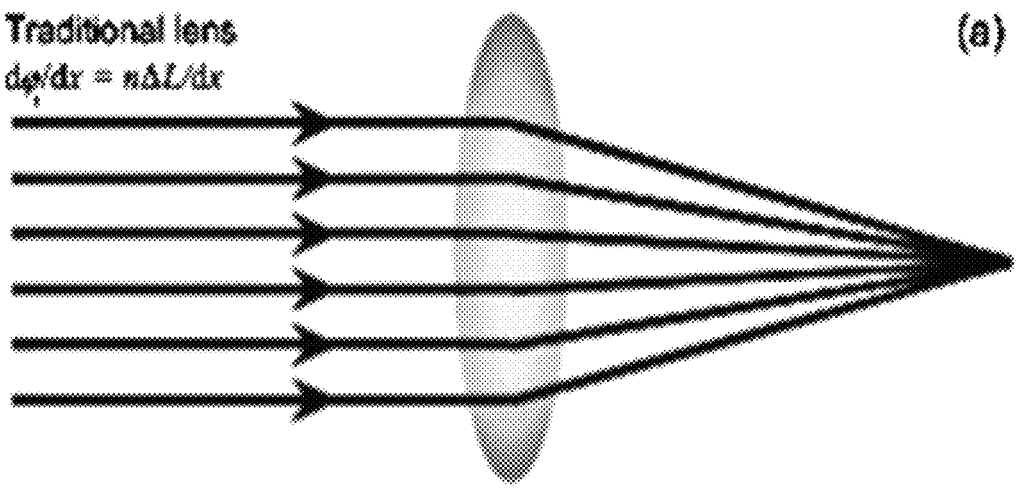
FIG. 1A shows (above) a schematic of a traditional lens, and (below) a schematic of a flat lens.
Figure 1A:
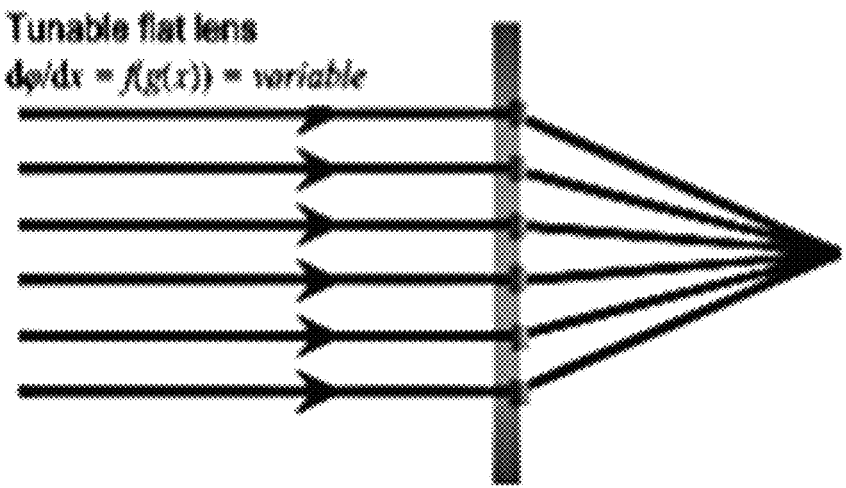
Figure 1B:
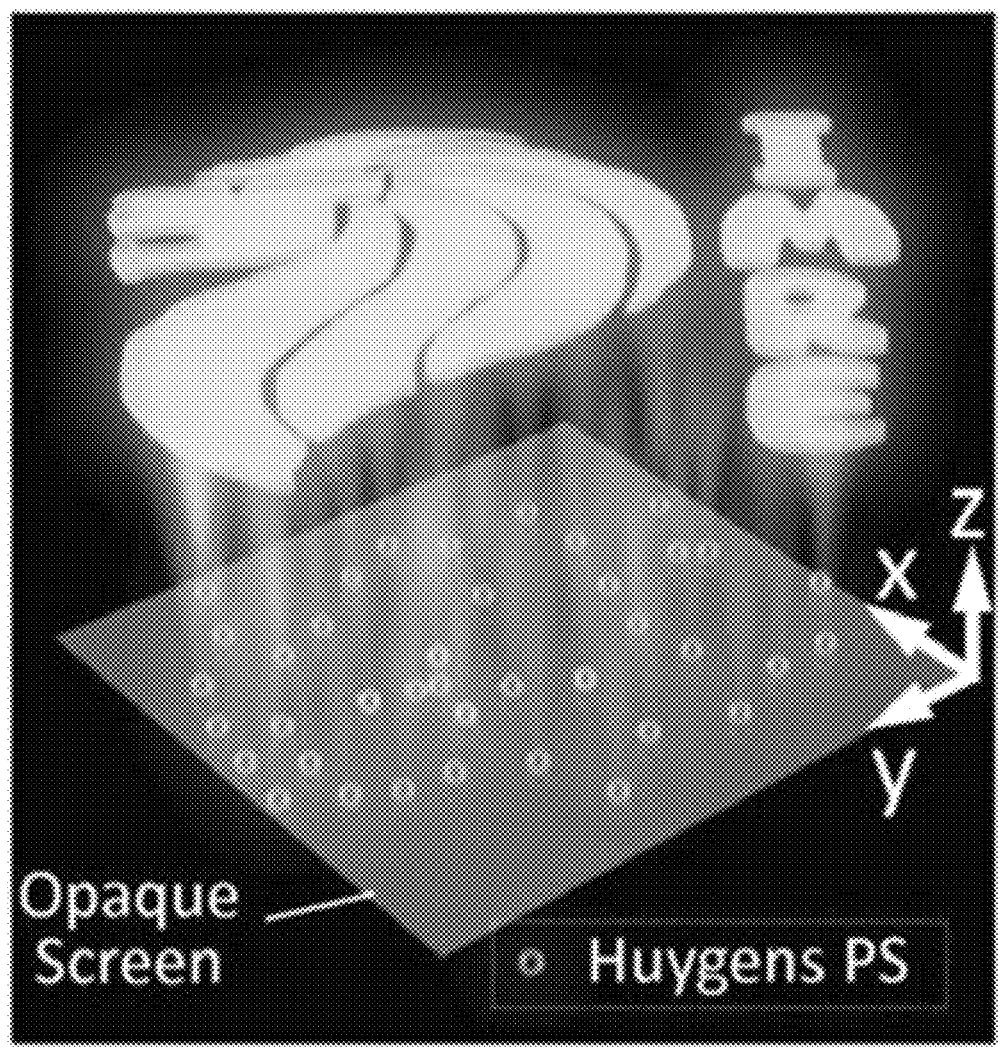
FIG. 1B is a schematic illustrating the generation of a hologram. A hologram may ideally have a large viewing angle and broadband operation.

Various embodiments may seek to address or mitigate issues faced by conventional optical devices such as conventional flat lens or conventional photon sieves. A flat lens may be a lens whose flat shape allows it to provide distortion-free imaging, potentially with arbitrarily-large apertures. FIG. 1A shows (above) a schematic of a traditional lens, and (below) a schematic of a flat lens. A photon sieve may be a device for focusing light using diffraction and interference. A photon sieve may be used to generate a hologram, which may be a photographic recording of a light field to display a fully three-dimensional image of the holographic subject. FIG. 1B is a schematic illustrating the generation of a hologram. A photon sieve for generating a hologram may ideally have a large viewing angle and broadband operation.

One drawback of conventional metallic material-based photon sieves is the low efficiency in the transmission mode Conventional flat lenses and photon sieves require enough thickness to block the light, e.g. in the scale of hundreds of nanometers for Au. The lossy nature of the metallic materials and the large thickness result in low transmission efficiency.

Various embodiments may relate to an optical device including a transition metal dichalcogenide material (TMDC) two-dimensional material. Due to high absorption demonstrated by TMDC materials such as molybdenum disulfide ($MoS_2$), the thickness of the optical device, such as a meta-lens or an optical sieve may be reduced from several hundred nanometers thick to only 10 nm thick. As a result, the efficiency of light passing through the meta-devices may be highly enhanced compared with the traditional metallic devices.

Figure 2:
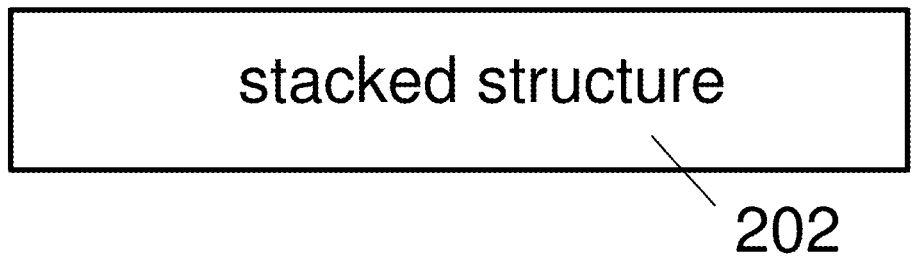
FIG. 2 is a general illustration of an optical device according to various embodiments.

FIG. 2 is a general illustration of an optical device according to various embodiments. The optical device may include a stacked structure 202 having a first surface and a second surface opposite the first surface. The stacked structure 202 may include a plurality of holes or grooves extending from the first surface towards the second surface. The stacked structure 202 may include a transition metal dichalcogenide material (TMDC) material. A thickness of the stacked structure may be of any value less than 100 nm.

In other words, the optical device may be a stacked structure defining features, such as a plurality of holes or a plurality of grooves, extending from a first surface of the stacked structure 202 towards a second opposing surface of the stacked structure. A thickness of the stacked structure may be any value less than 100 nm.

In various embodiments, the stacked structure 202 may include a plurality of layers of the transition metal dichalcogenide material (TMDC) material. The optical device may be formed by depositing a first layer of the TDMC material, depositing a second layer of the TDMC material on the first layer of the TDMC material, e.g. via a method such as physical vapor deposition (PVD) or chemical vapor deposition (CVD). In such a manner, the stacked structure 202 may be formed by depositing multiple layers such that the multiple layers are stacked together.

In various embodiments, the stacked structure 202 may be of any value equal to or less than 50 nm, e.g. any value equal to or less than 10 nm.

In various embodiments, the transition metal dichalcogenide (TMDC) material may be a two-dimensional (2D) transition metal dichalcogenide (TMDC) material. The transition metal dichalcogenide (TMDC) material may include a transition element (e.g., titanium, molybdenum, tungsten, and niobium) and a chalcogen element (e.g. selenium, sulfur, or telluride). The transition metal dichalcogenide (TMDC)

material may, for instance, be molybdenum disulfide ($MoS_2$), tungsten disulfide ($WS_2$), or tungsten diselenide ($WSe_2$).

In various embodiments, the optical device may be a flat super oscillatory lens (SOL). The plurality of grooves may form a plurality of concentric ring structures. The super oscillatory lens may be configured to generate a sub-diffraction limit focusing spot upon light incident onto the flat lens such that the sub-diffraction limit focusing spot is of a full width at half maximum (FWHM) equal to or less than 0.4 times of a wavelength of the light, and of an intensity equal to or more than 80 times an intensity of the light incident onto the flat lens.

In various embodiments, the optical device may be a planar diffraction lens, such as a Fresnel zone plate (FZP) or a supercritical lens (SCL).

In various embodiments, the optical device may be configured to generate a sub-diffraction limit focusing spot upon light incident onto the optical device such that the sub-diffraction limit focusing spot is of a full width at half maximum (FWHM) equal to or less than 0.515 times of a wavelength of the light divided by a numerical aperture of the optical device.

In various embodiments, the optical device may be a photon sieve. The plurality of holes may extend from the first surface of the stacked structure to the second surface of the stacked structure. The photon sieve may be configured to generate a hologram at a total efficiency (TE) of more than 20% upon light incident onto the photon sieve along a normal of the photon sieve. In various embodiments, a total efficiency when light is incident onto the photon sieve at an angle 30° may be at a value more than 75% of a total efficiency when light is incident onto the photon sieve along the normal. In various embodiments, the hologram may be generated at a total efficiency of more than 15% when light is incident onto the photon sieve at an angle 30° to the normal. Total efficiency (TE) is a measure of how much optical power in the projected image compared to the power incident onto the optical device. On the other hand, diffractive efficiency (DE) is a measure of how much optical power in the projected image compared to the optical power from the optical device.

In the current context, light may be visible light, ultra-violet (UV) light and/or infrared (IR) light.

In various embodiments, the optical device may include a substrate, such as a sapphire substrate. The stacked structure 202 may be on the substrate. The substrate may be configured to allow at least some of the light to pass through.

Figure 3:
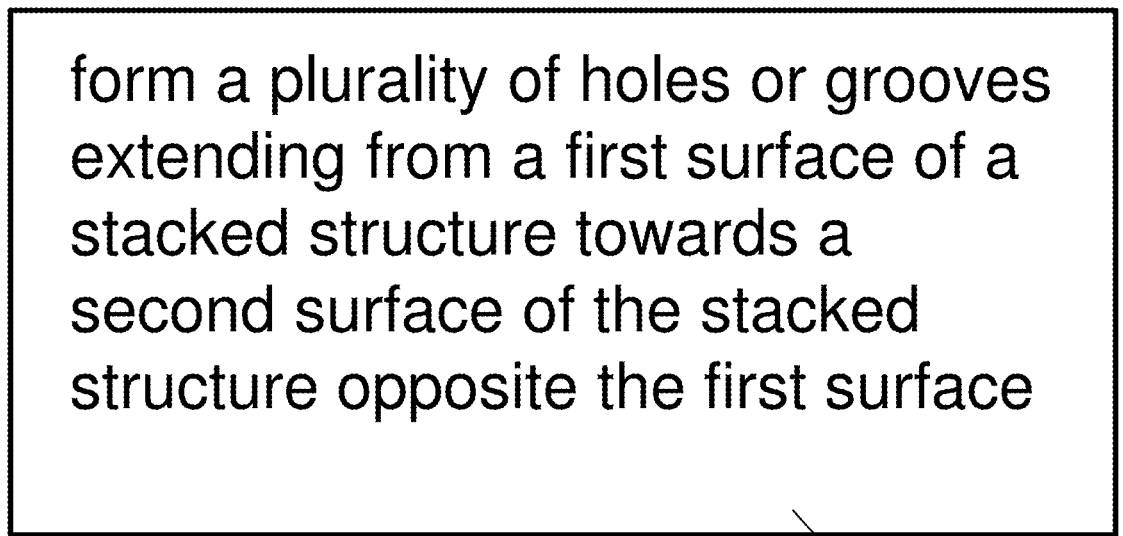
FIG. 3 is a general illustration of a method of forming an optical device according to various embodiments.

FIG. 3 is a general illustration of a method of forming an optical device according to various embodiments. The method may include, in 302, forming a plurality of holes or grooves extending from a first surface of a stacked structure towards a second surface of the stacked structure opposite the first surface. The stacked structure may include a transition metal dichalcogenide material (TMDC) material. A thickness of the stacked structure may be of any value less than 100 nm.

In other words, the method may include forming features such as holes or grooves on a thin stacked structure of TMDC material which is less than 100 nm thick to fabricate the optical device.

In various embodiments, the thickness of the stacked structure may be of any value equal to or less than 10 nm.

In various embodiments, the method may also include forming the stacked structure on a substrate via physical vapor deposition or chemical vapor deposition before forming the plurality of holes or grooves.

In various embodiments, the method may include depositing a mask layer on the stacked structure after forming the stacked structure and before forming the plurality of holes or grooves. The mask layer may include a suitable material, such as a metal, a polymer, or a dielectric material. The metal may, for instance, be gold (Au), or chromium (Cr). The polymer may, for instance be, poly(methyl methacrylate), or a photoresist. The dielectric material may, for instance, be silicon oxide ($SiO_2$) or aluminum oxide ($Al_2O_3$).

In various embodiments, the plurality of holes or grooves may be formed by etching (e.g. focused ion beam (FIB) etching, plasma etching, or reactive ion etching) through the mask layer.

In various embodiments, the method may also include removing the mask layer from the stacked structure after forming the plurality of holes or grooves on the stacked structure. The mask layer may be removed via chemical etching.

In various embodiments, the optical device may be a planar diffraction lens, such as a Fresnel zone plate (FZP), a super oscillatory lens (SOL), or a supercritical lens (SCL).

In various other embodiments, the optical device may be a photon sieve.

Figure 4:
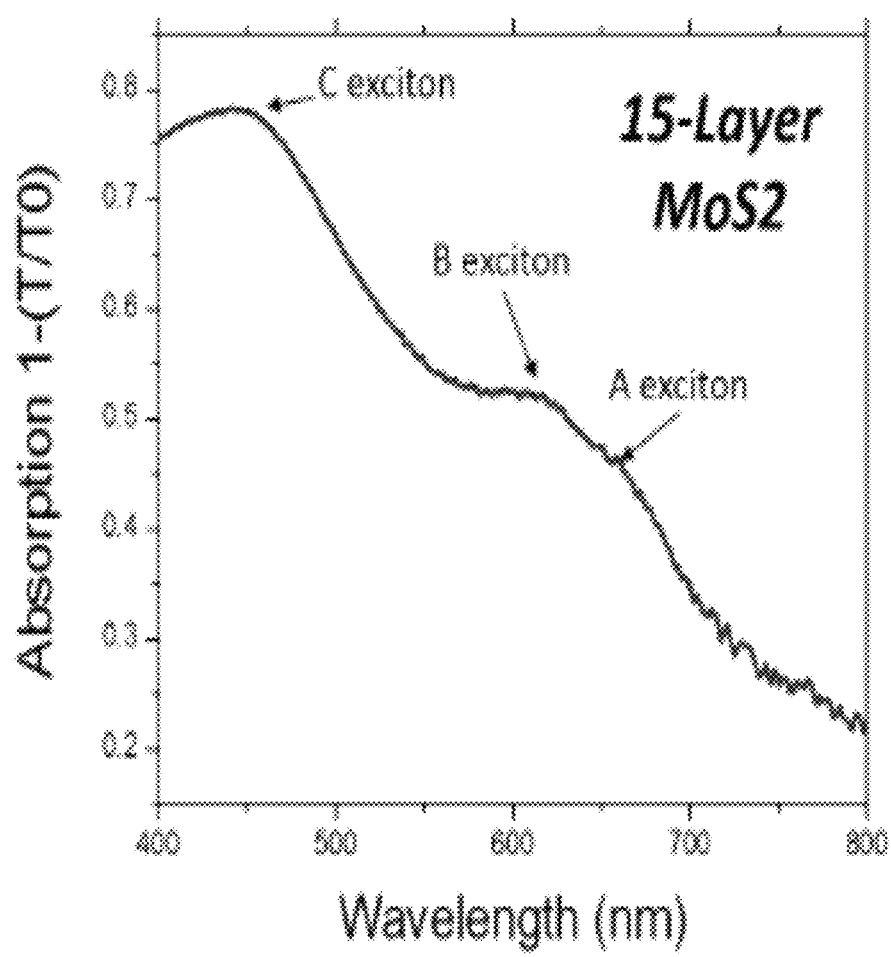
FIG. 4 is a plot of absorption as a function of wavelength (in nanometers or nm) showing the absorption spectra of a 15-layer molybdenum disulfide ($MoS_2$) grown by magnetron sputtering, a physical vapor deposition (PVD) according to various embodiments.

FIG. 4 is a plot of absorption as a function of wavelength (in nanometers or nm) showing the absorption spectra of a 15-layer molybdenum disulfide ($MoS_2$) grown by magnetron sputtering, a physical vapor deposition (PVD) according to various embodiments. High absorption close to 80% is observed around 450 nm, which is due to the unique band nestling effect in 2D $MoS_2$. Various embodiments may be based on this 15-layer $MoS_2$.

Figure 5A:
FIG. 5A is a schematic showing a method of forming an optical device according to various embodiments.
Figure 5A:
Figure 5A:
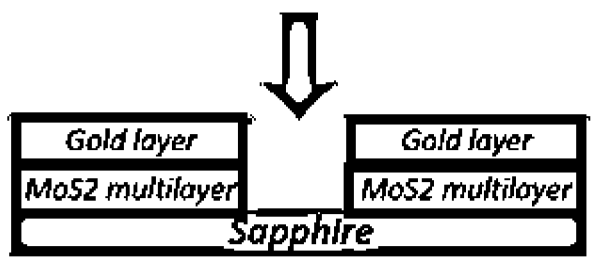
Figure 5A:
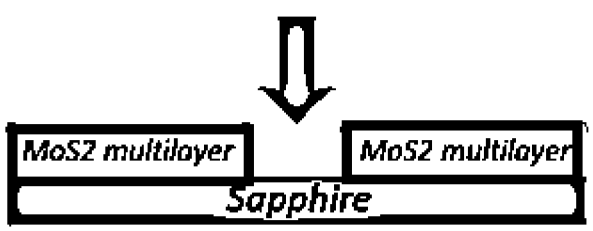

FIG. 5A is a schematic showing a method of forming an optical device according to various embodiments. In Step 1, a multilayer molybdenum disulfide ($MoS_2$) stack may be formed on a substrate, such as a sapphire substrate, e.g. via physical vapor deposition (PVD). In Step 2, a masking layer, e.g. a gold masking layer, may be formed on the multilayer molybdenum disulfide ($MoS_2$) stack. In Step 3, focused ion beam (FIB) etching may be carried out to remove a portion of the multilayer molybdenum disulfide ($MoS_2$) stack, as well as the overlying portion of gold masking layer, thereby forming holes or grooves. In Step 4, the gold masking layer may be removed, e.g. via chemical etching.

Binary super oscillatory lens (SOL) have been investigated in recent years. SOL is known to have strong focusing ability but with a tradeoff of low efficiency. The thick metallic materials used, which is mostly above 100 nm, is partly the reason for the low efficiency. In various embodiments, a 10 nm thickness $MoS_2$ multilayer stack may be used as a base. Concentric ring groove structures may be formed on the stack. The transmittance coefficient of the resultant SOL is measured. It is demonstrated that the dramatically reduced thickness of the lens may largely improve the light transmittance, hence increasing the total efficiency. The results as described herein also show that it is possible to use transmissive materials instead of traditional metallic mask for SOL designs.

Figure 5B:
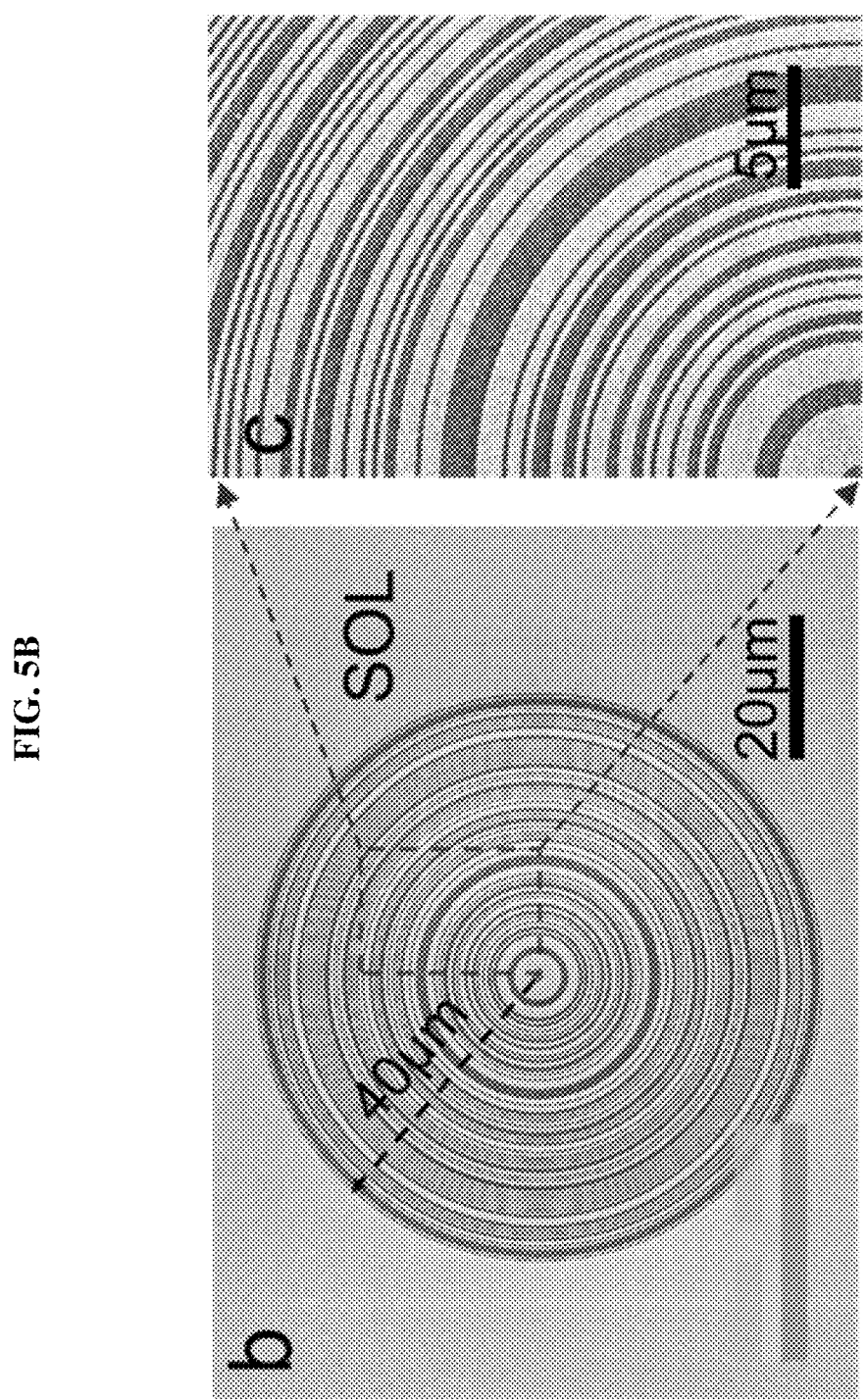
FIG. 5B shows (left) an optical image of a super oscillatory lens (SOL) with overlying gold layer according to various embodiments; and (right) a magnified image of a portion of the super oscillatory lens (SOL) with overlying gold layer shown on the left according to various embodiments.

FIG. 5B shows (left) an optical image of a super oscillatory lens (SOL) with overlying gold layer according to various embodiments; and (right) a magnified image of a portion of the super oscillatory lens (SOL) with overlying gold layer shown on the left according to various embodiments.

Figure 5C:
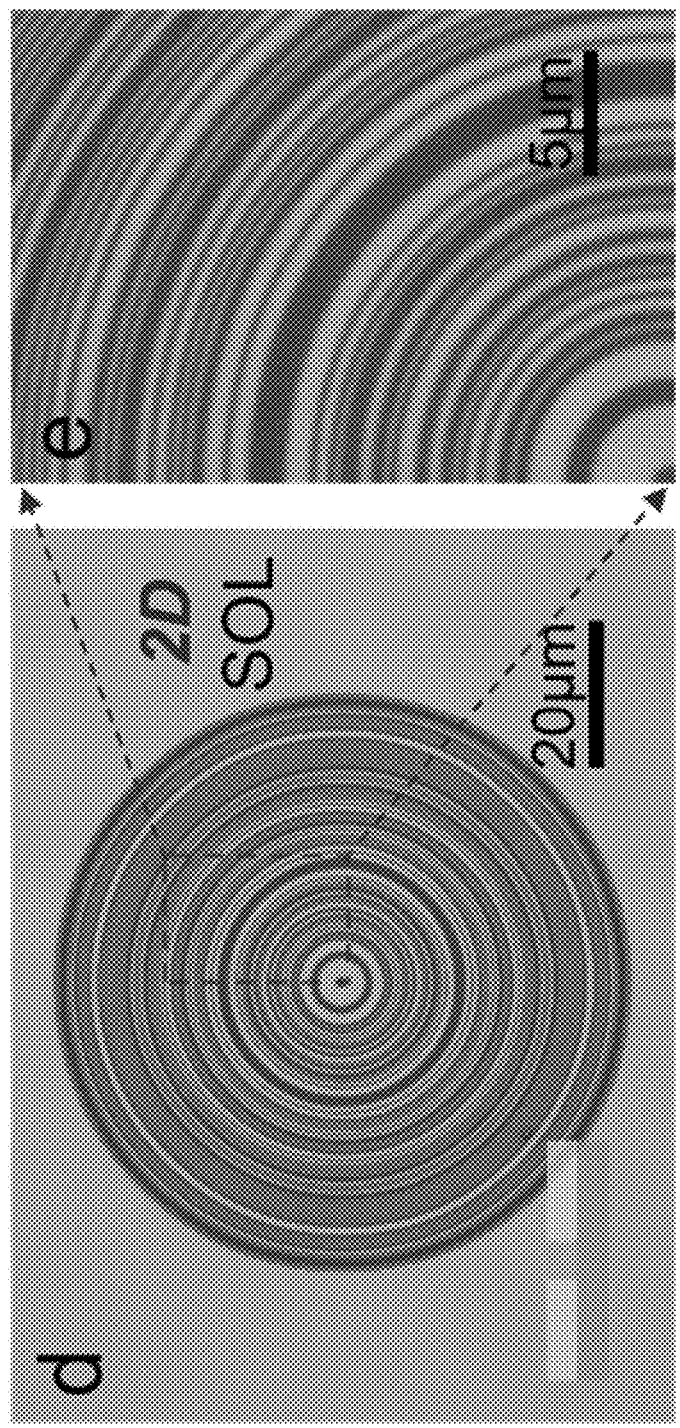
FIG. 5C shows (left) an optical image of a super oscillatory lens (SOL) (without overlying gold layer) according to various embodiments; and (right) a magnified image of a portion of the super oscillatory lens (SOL) shown on the left according to various embodiments.

FIG. 5C shows (left) an optical image of a super oscillatory lens (SOL) (without overlying gold layer) according to various embodiments; and (right) a magnified image of a portion of the super oscillatory lens (SOL) shown on the left according to various embodiments.

FIGS. 5B-C demonstrate that it is possible to form fine structures on the multilayer molybdenum disulfide ($MoS_2$) stack.

Figure 6A:
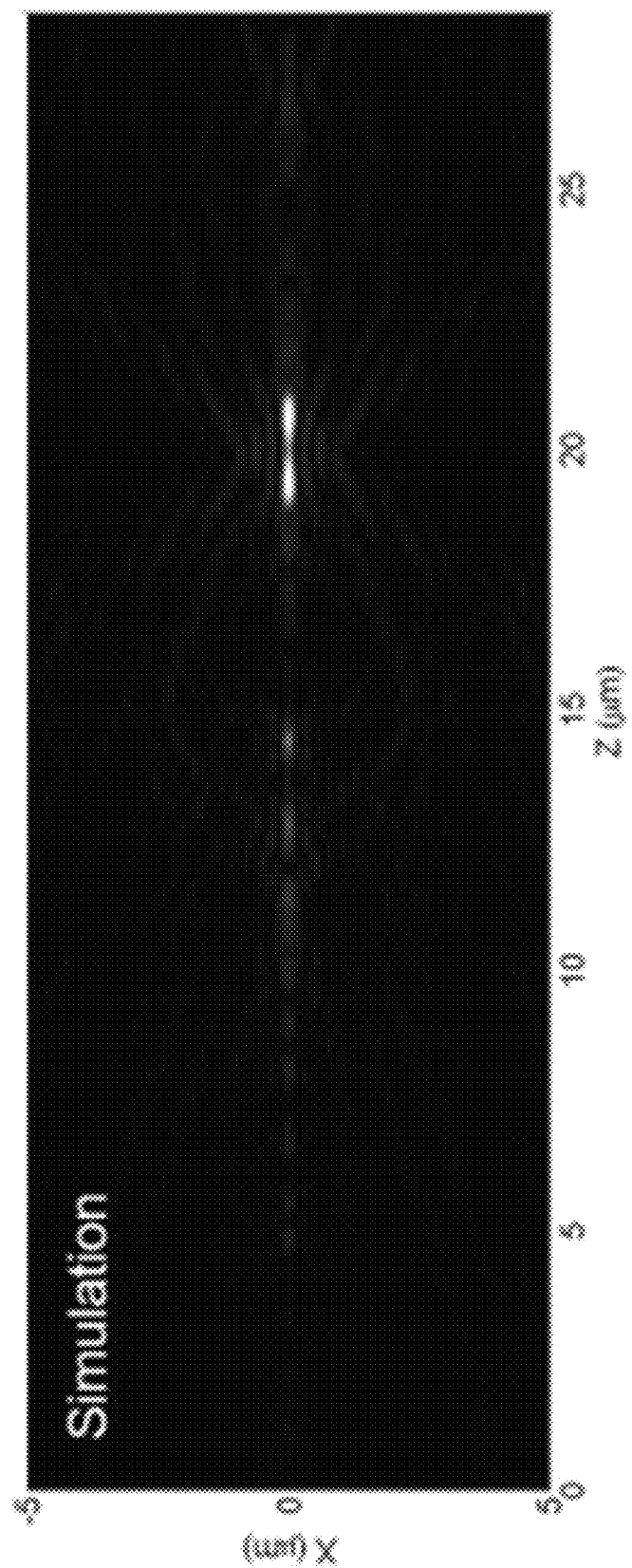
FIG. 6A is a plot along the x dimension (in micrometer or μm) as a function of along the z dimension (in micrometer or μm) showing the simulated intensity profile of the super oscillatory lens (SOL) according to various embodiments along the propagation distance in the region from z=0 to 27 μm.
Figure 6B:
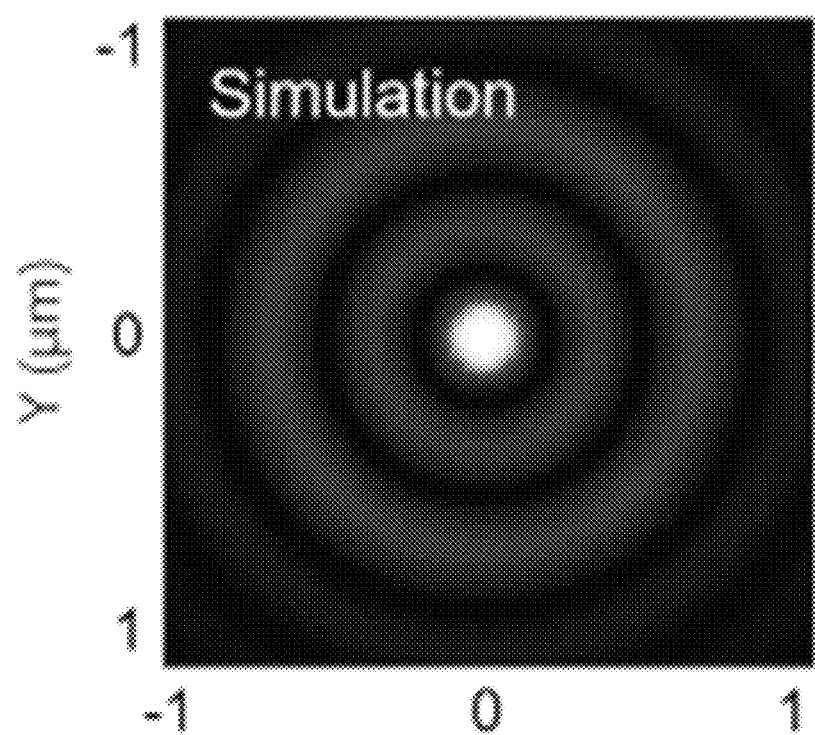
FIG. 6B is a plot along the y dimension (in micrometer or μm) as a function of along the x dimension (in micrometer or μm) showing the simulated intensity profile of the super oscillatory lens (SOL) according to various embodiments in the traverse focal plane.

FIG. 6A is a plot along the x dimension (in micrometer or μm) as a function of along the z dimension (in micrometer or μm) showing the simulated intensity profile of the super oscillatory lens (SOL) according to various embodiments along the propagation distance in the region from z=0 to 27 μm. FIG. 6B is a plot along the y dimension (in micrometer or μm) as a function of along the x dimension (in micrometer or μm) showing the simulated intensity profile of the super oscillatory lens (SOL) according to various embodiments in the traverse focal plane.

Figure 6C:
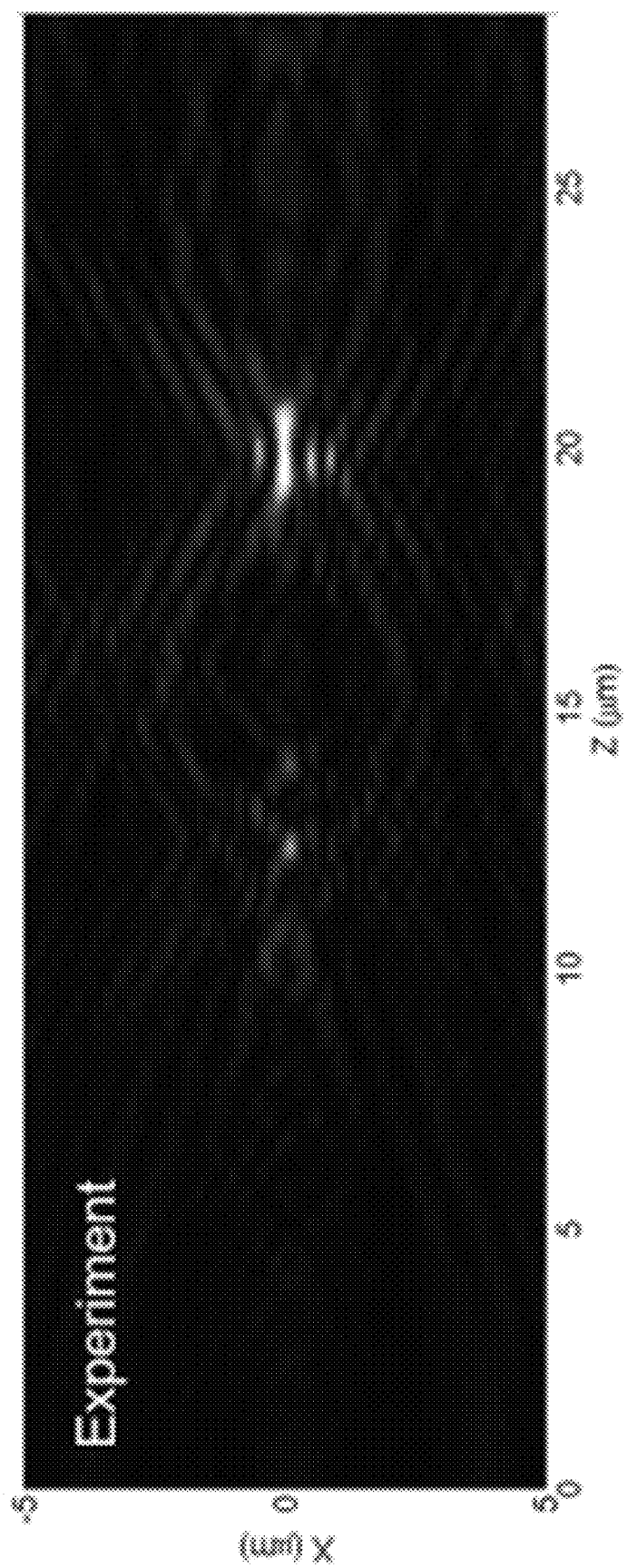
FIG. 6C is a plot along the x dimension (in micrometer or μm) as a function of along the z dimension (in micrometer or μm) showing the measured intensity profile of the super oscillatory lens (SOL) according to various embodiments along the propagation distance in the region from z=0 to 27 μm.
Figure 6D:
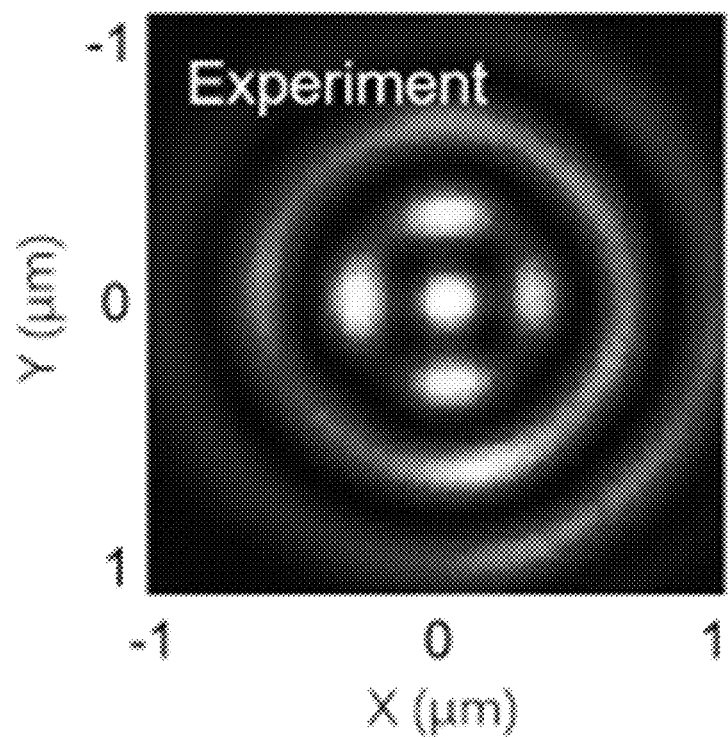
FIG. 6D is a plot along the y dimension (in micrometer or μm) as a function of along the x dimension (in micrometer or μm) showing the measured intensity profile of the super oscillatory lens (SOL) according to various embodiments in the traverse focal plane.

FIG. 6C is a plot along the x dimension (in micrometer or μm) as a function of along the z dimension (in micrometer or μm) showing the measured intensity profile of the super oscillatory lens (SOL) according to various embodiments along the propagation distance in the region from z=0 to 27 μm. FIG. 6D is a plot along the y dimension (in micrometer or μm) as a function of along the x dimension (in micrometer or μm) showing the measured intensity profile of the super oscillatory lens (SOL) according to various embodiments in the traverse focal plane.

Figure 6E:
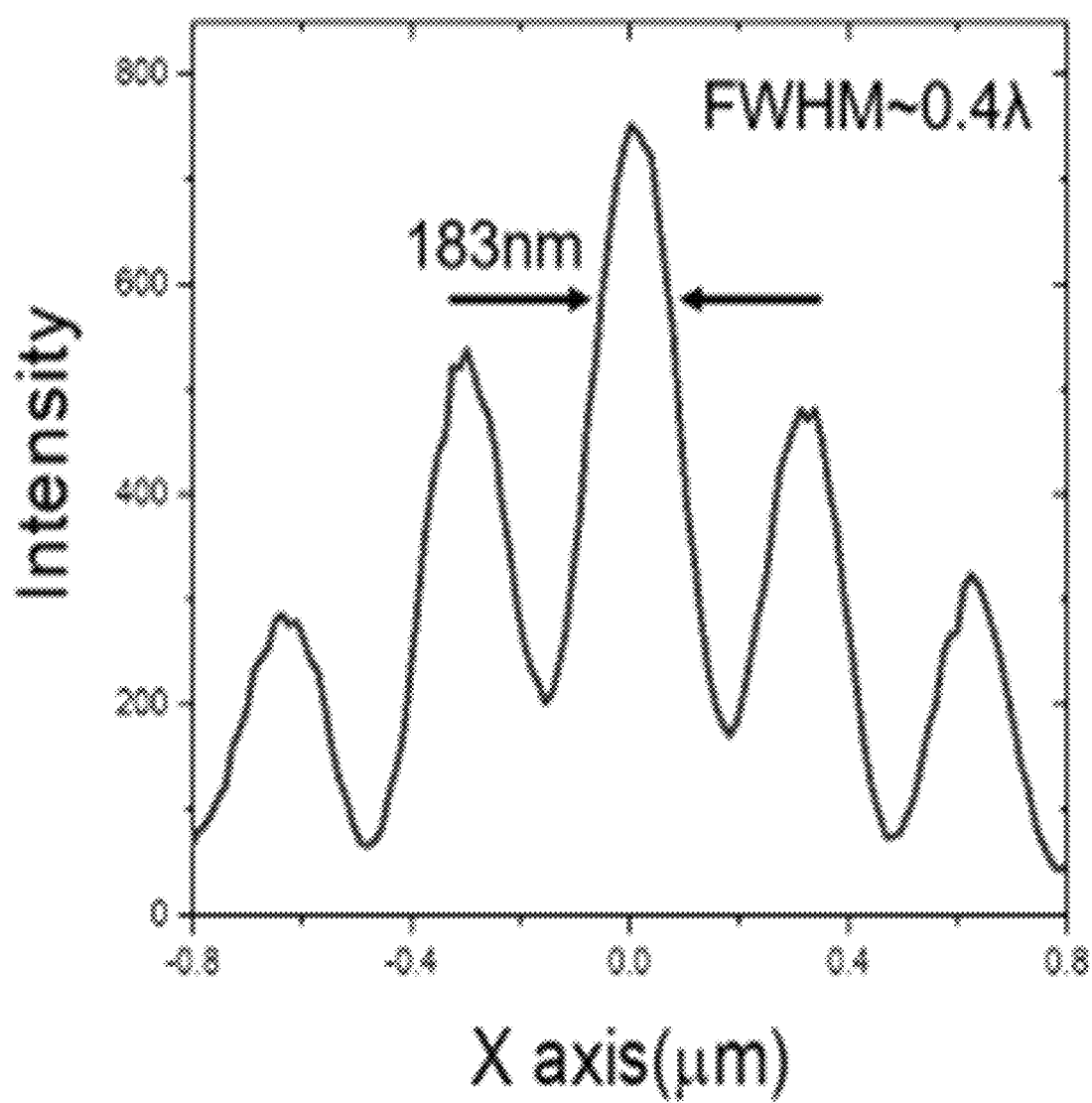
FIG. 6E is a plot of intensity as a function along the x dimension (in micrometer or μm) showing the measured intensity profile along the x-axis of the focal spot according to various embodiments.

FIG. 6E is a plot of intensity as a function along the x dimension (in micrometer or μm) showing the measured intensity profile along the x-axis of the focal spot according to various embodiments.

FIGS. 6A-E show that the simulated and experimental results of the 2D SOL are in good agreement. The designed wavelength here is 450 nm, corresponding to the absorption peak of the layered $MoS_2$. It is notable that a SOL working at a shorter wavelength may place greater demand on the finesse and accuracy of fabrication. It has been shown that the atomically thin 2D SOL may generate a spot size with the full-width-at-half-maximum (FWHM) of 0.4λ, below the diffraction limit. The light intensity in the 2D SOL hotspot was more than 80 times that of the incident light. This may be the first time the concentration ratio of SOLs at shorter wavelength below 500 nm has been reported. Comparing with the SOL reported previously which shows a concentration ratio of 25 times at the working wavelength of 640 nm, various embodiments at 450 nm show more than 3 times higher focusing efficiency. This may be highly beneficial towards the practical usage of SOL. The purpose of demonstrating SOL is to verify the applicability of this 2D platform. In various embodiments, the optical device may be a Fresnel zone plate (FZP) or a supercritical lens (SCL). It is widely accepted that the realization of a SOL places greater demand in terms of fabrication and measurement compared with traditional Fresnel zone plate (FZP) and supercritical lens (SCL), which indicates various embodiments can be widely applied in planar diffraction lens.

Nowadays, computer-generated holography (CGH) is the main method for reconstructing images for two-dimensional (2D) and three-dimensional (3D) displays and various technologies were development to enable CGH. Among them, ultrahigh-capacity aperiodic photon sieves have attracted intense attentions in generating high quality holographic images with the advantages of polarization independence, broad operation band, large-view-angle, etc. However, the reported efficiency of photon sieves based on metals is very low, less than 2%, which can hardly reach the requirement for practical usage.

A multi-layered $MoS_2$ based photon sieve is described herein which may be able to achieve more than 10 times higher imaging efficiency and further enlarged angle of view.

Under the illumination of lasers, photon sieves may act as secondary Huygens point sources displaying interference in the target plane. The diffraction pattern may mainly be dominated by the aperture shape because all the nanoholes within this aperture contribute to the interfered pattern. A genetic algorithm-based technique may be employed to determine the locations of nanoholes on a photon sieve for reconstructing an image composed of the letters "NANO".

Figure 7A:
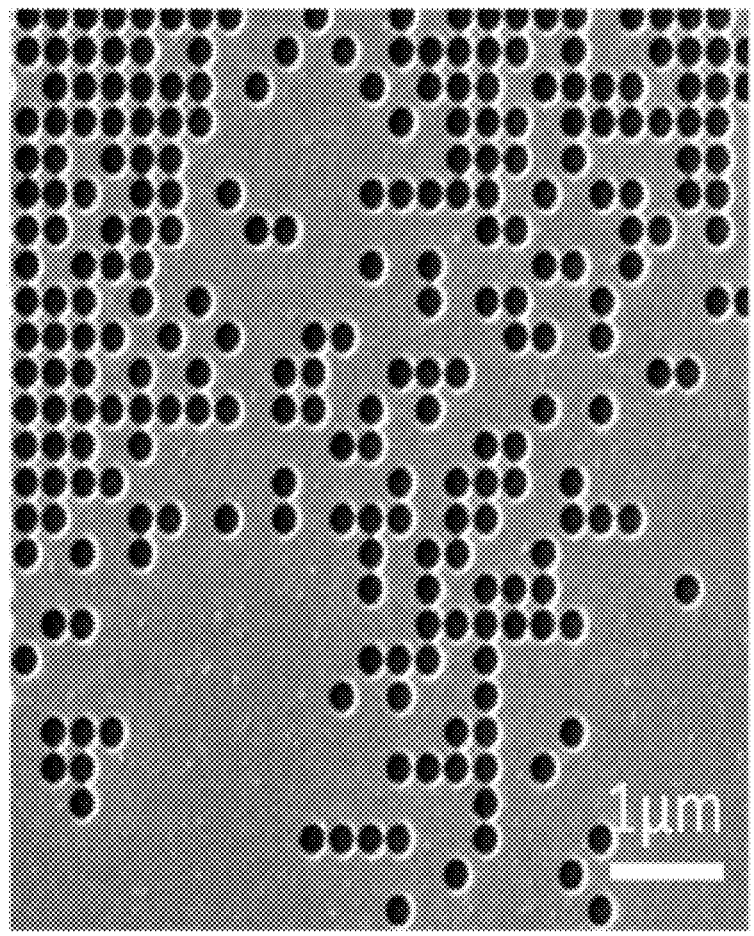
FIG. 7A shows a scanning electron microscopy (SEM) image of a photon sieve according to various embodiments.
Figure 7B:
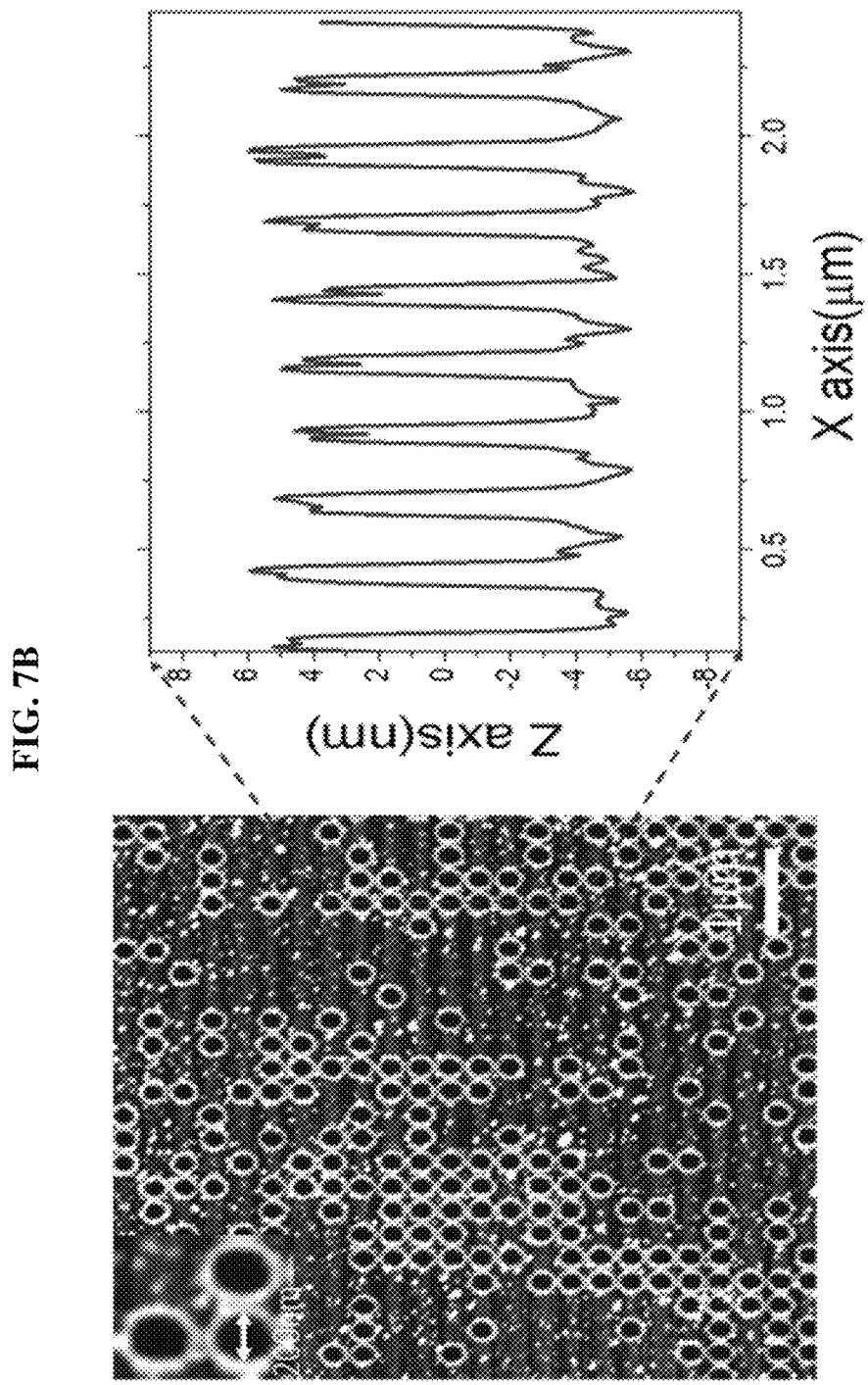
FIG. 7B shows (left) an atomic force microscopy (AFM) image of a photon sieve according to various embodiments; and (right) a plot along the z axis (in nanometers or nm) as a function of along the x a is showing the thickness profile of the photon sieve according to various embodiments.

The 2D materials and nanofabrication method employed may be similar to the previously mentioned 2D SOL. FIG. 7A shows a scanning electron microscopy (SEM) image of a photon sieve according to various embodiments. FIG. 7B shows (left) an atomic force microscopy (AFM) image of a photon sieve according to various embodiments; and (right) a plot along the z axis (in nanometers or nm) as a function of along the x a is showing the thickness profile of the photon sieve according to various embodiments.

It can be seen that the nanoholes on the photon sieve is each of about 200 nm in diameter. The pitch between nanoholes is about 225 nm. The nanoholes are fabricated on the 10 nm thick multi-layered $MoS_2$ stack, which proves again that the nanofabrication method developed is highly effective.

Figure 8A:
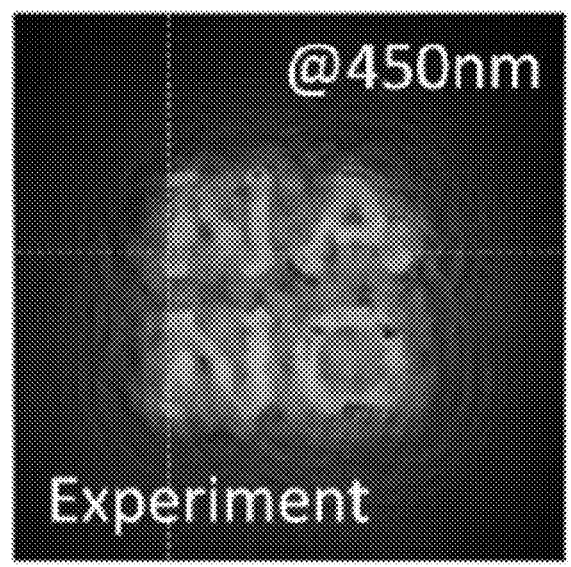
FIG. 8A shows a holographic image projection generated by a photon sieve according to various embodiments at a wavelength of about 450 nm.
Figure 8B:
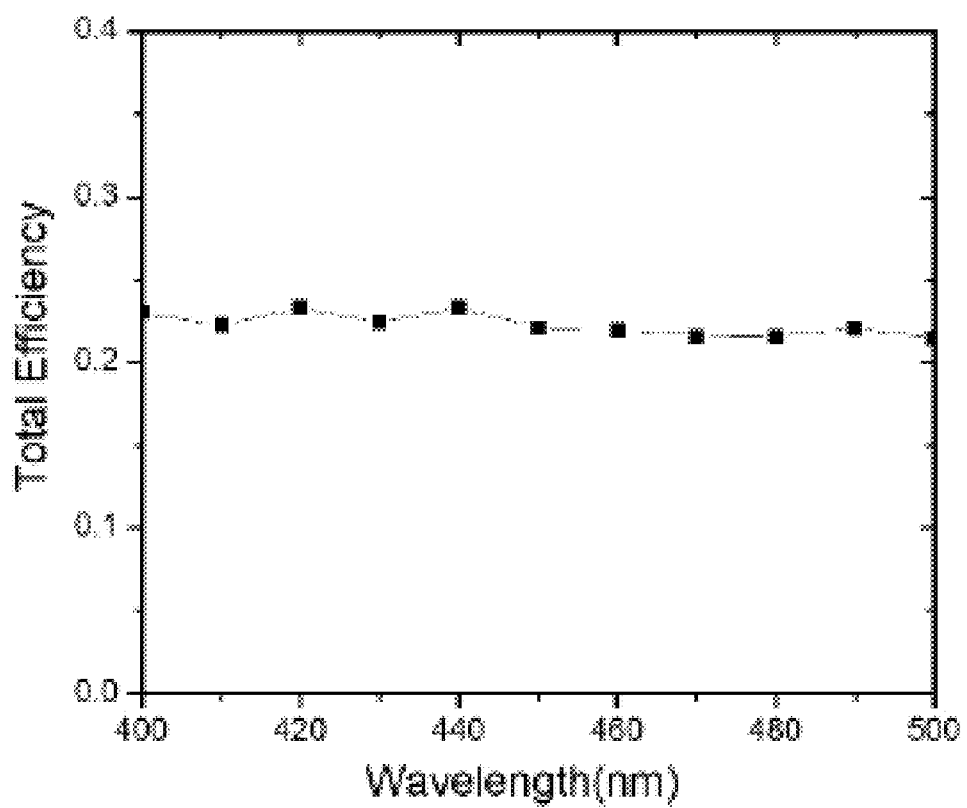
FIG. 8B is a plot of total efficiency as a function of wavelength (in nanometers or nm) showing the total efficiency (TE) of the photon sieve according to various embodiments in generating two dimensional holograms from about 400 nm to about 500 nm.

FIG. 8A shows a holographic image projection generated by a photon sieve according to various embodiments at a wavelength of about 450 nm. The image displays the word 'NANO'. In addition, the total efficiency of the photon sieve throughout the wavelength range from about 400 nm to about 500 nm has been investigated. FIG. 8B is a plot of total efficiency as a function of wavelength (in nanometers or nm) showing the total efficiency (TE) of the photon sieve according to various embodiments in generating two dimensional holograms from about 400 nm to about 500 nm. It can be seen that more than 20% TE is achieved throughout this range. This is more than 10 times higher than what has been previously reported regarding this wavelength range.

Figure 8C:
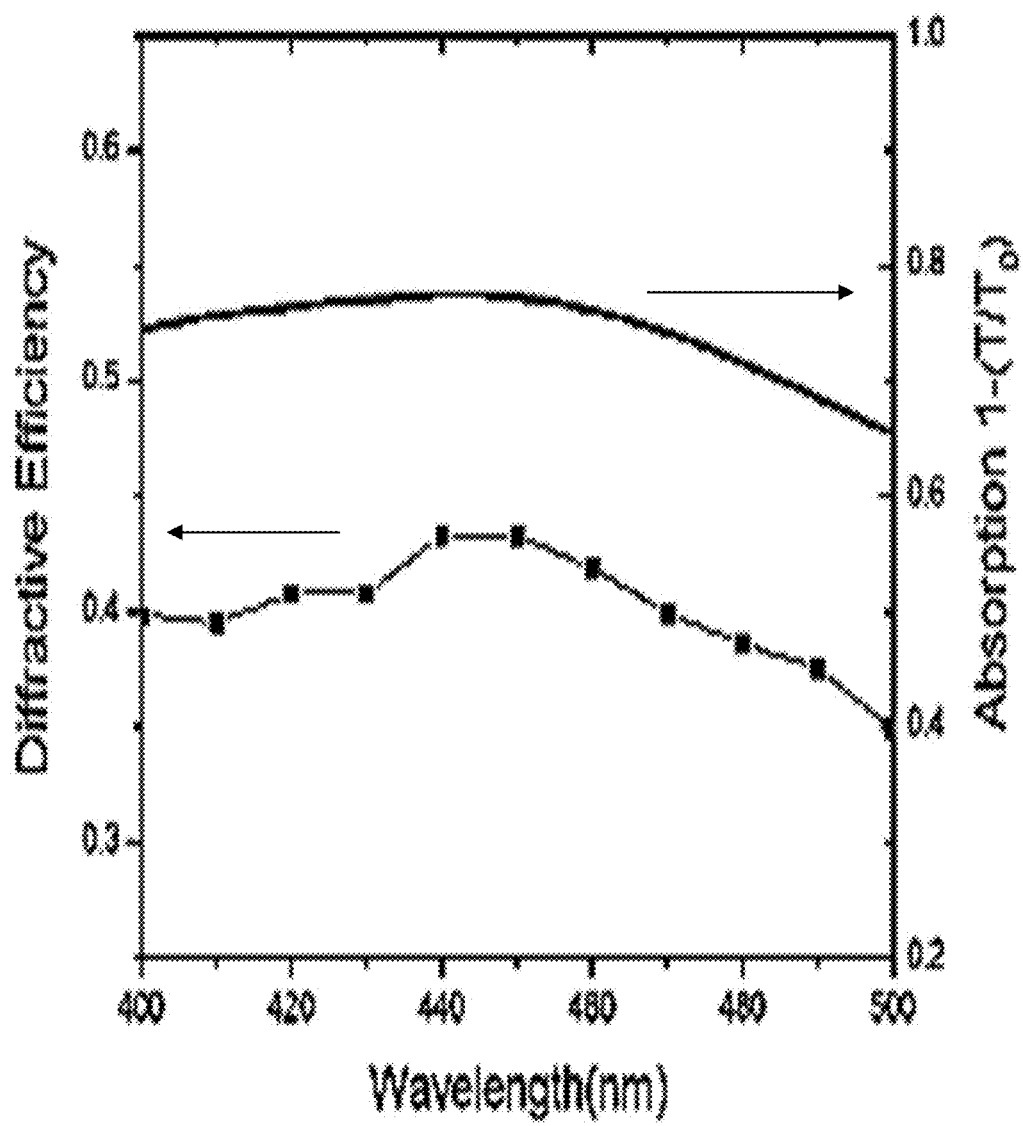
FIG. 8C is a plot of absorption as a function of wavelength (in nanometers or nm) comparing the absorption spectrum of layered molybdenum disulfide ($MoS_2$) and the wavelength dependent diffractive efficiency of the photo sieve according to various embodiments in generating the hologram.

FIG. 8C is a plot of absorption as a function of wavelength (in nanometers or nm) comparing the absorption spectrum of layered molybdenum disulfide ($MoS_2$) and the wavelength dependent diffractive efficiency of the photo sieve according to various embodiments in generating the hologram. The two curves show a similar trend, which may be understandable. As higher absorption can reduce the unwanted light projecting onto the target plane from the unstructured area of the photon sieve while the energy of light passing through the nanoholes is more or less unchanged, this may lead to a higher signal-to-noise ratio.

Figure 9A:
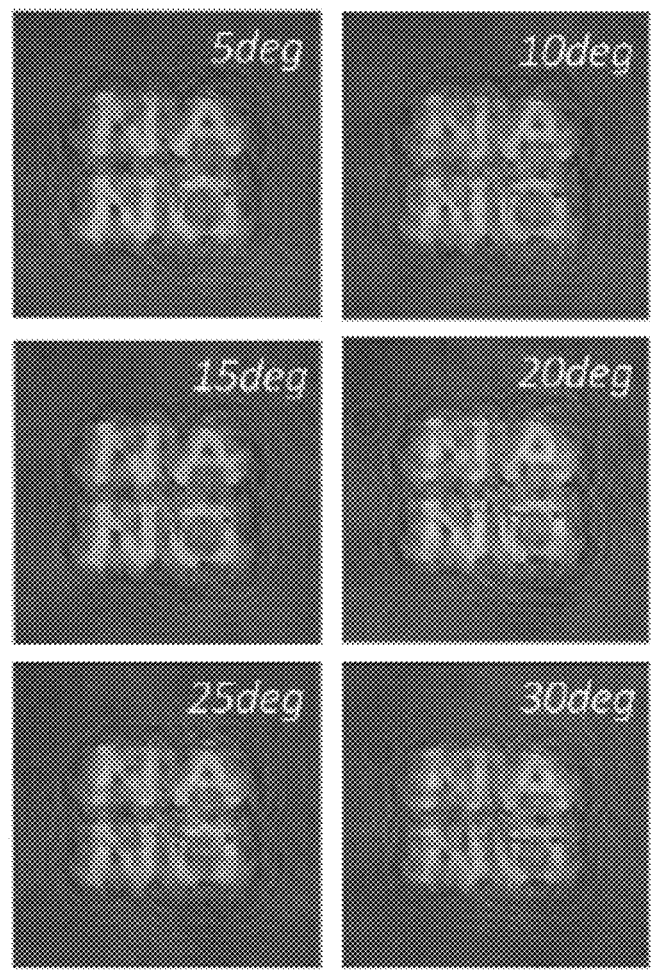
FIG. 9A shows experimentally captured optical images of holographic image projections generated by the photon sieve at different angles of incident light relative to the normal of the photon sieve according to various embodiments.
Figure 9B:
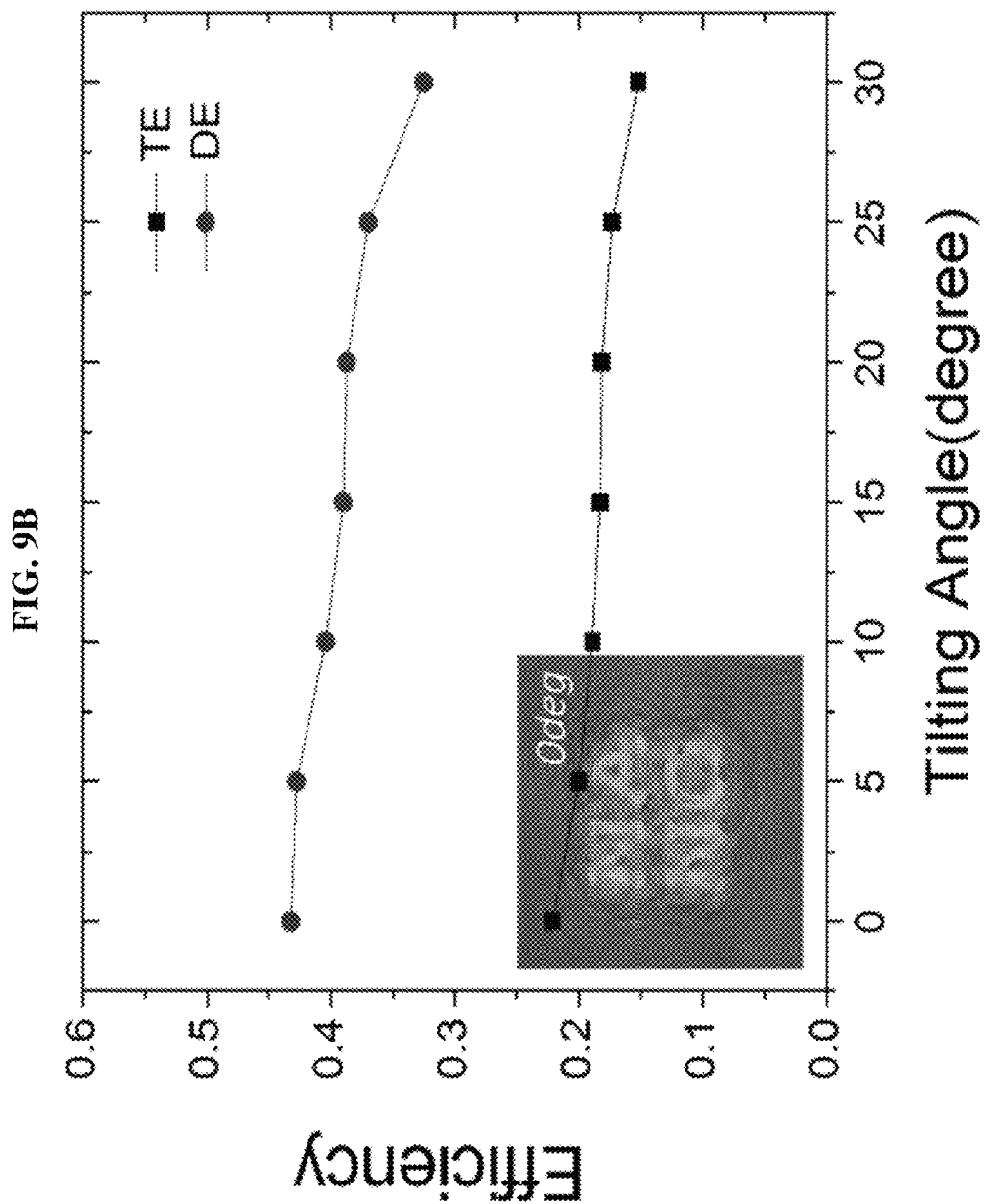
FIG. 9B is a plot of efficiency as a function of tilting angle (in degree) showing the variation of total efficiency (TE) and diffractive efficiency (DE) of the photon sieve according to various embodiments at different tilting angles.

The tolerance of the photon sieve to oblique incidence of light is further investigated. FIG. 9A shows experimentally captured optical images of holographic image projections generated by the photon sieve at different angles of incident light relative to the normal of the photon sieve according to various embodiments. The angle of incident light relative to the normal (i.e. the tilting angle) is varied at an interval of 5 degrees (i.e. at 5 degrees, 10 degrees, 15 degrees, 20 degrees, 25 degrees and 30 degrees). FIG. 9A shows that the holographic image is still distinguishable even at the tilting angle of 30 degrees. FIG. 9B is a plot of efficiency as a function of tilting angle (in degree) showing the variation of total efficiency (TE) and diffractive efficiency (DE) of the photon sieve according to various embodiments at different tilting angles. FIG. 9B shows that as the tilting angle is increased, the total efficiency (TE) and the diffractive efficiency (DE) are only slightly decreased. The total efficiency (TE) is still more than 15% with a 30 degrees tilting angle.

Various embodiments may relate to an imaging platform which is realized by atomically thin transition metal dichalcogenide (TMDC) layers. Through fabricating well-designed nanostructures on the 2D TMDC layers, the thickness of the photon sieves and the SOL is reduced from several hundred nanometers thick to just 10 nm, which enables both ultra-high efficiency holographic imaging with an enlarged angle of view as well as super oscillatory focusing with a sub-diffraction limit focal spot size of 0.4 k.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical device comprising:
a stacked structure having a first surface and a second surface opposite the first surface;
wherein the stacked structure comprises a plurality of holes or grooves extending from the first surface towards the second surface;
wherein the stacked structure comprises a transition metal dichalcogenide (TMDC) material; and
wherein a thickness of the stacked structure is of any value less than 100 nm;
wherein the optical device is a super oscillatory lens (SOL), a super-critical lens (SCL), or a Fresnel zone plate configured to generate a sub-diffraction limit focusing spot, or a photon sieve configured to generate a hologram, upon light incident onto the optical device; and
wherein the light is any one selected from a group consisting of visible light, ultraviolet (UV) light and infrared (IR) light.

2. The optical device according to claim 1, wherein the thickness of the stacked structure is of any value equal to or less than 10 nm.

3. The optical device according to claim 1, wherein the stacked structure comprises a plurality of layers of the transition metal dichalcogenide (TMDC) material.

4. The optical device according to claim 1, wherein the transition metal dichalcogenide (TMDC) material is molybdenum disulfide ($MoS_2$).

5. The optical device according to claim 1, wherein the plurality of grooves of the super oscillatory lens (SOL), the super-critical lens (SCL), or the Fresnel zone plate forms a plurality of concentric ring structures.

6. The optical device according to claim 5, wherein the optical device is configured to generate the sub-diffraction limit focusing spot upon the light incident onto the optical device such that the sub-diffraction limit focusing spot is of a full width at half maximum (FWHM) equal to or less than 0.515 times of a wavelength of the light divided by a numerical aperture of the optical device.

7. The optical device according to claim 1, wherein the plurality of holes of the photon sieve extends from the first surface of the stacked structure to the second surface of the stacked structure.

8. The optical device according to claim 7, wherein a total efficiency when the light is incident onto the photon sieve at an angle 30° is at a value more than 75% of a total efficiency when the light is incident onto the photon sieve along the normal.

9. A method of forming an optical device, the method comprising:
forming a plurality of holes or grooves extending from a first surface of a stacked structure towards a second surface of the stacked structure opposite the first surface;
wherein the stacked structure comprises a transition metal dichalcogenide (TMDC) material; and
wherein a thickness of the stacked structure is of any value less than 100 nm;
wherein the optical device is a super oscillatory lens (SOL), a super-critical lens (SCL), or a Fresnel zone plate configured to generate a sub-diffraction limit focusing spot, or a photon sieve configured to generate a hologram, upon light incident onto the optical device; and
wherein the light is any one selected from a group consisting of visible light, ultraviolet (UV) light and infrared (IR) light.

10. The method according to claim 9, wherein the thickness of the stacked structure is of any value equal to or less than 10 nm.

11. The method according to claim 9, further comprising:
forming the stacked structure on a substrate via physical vapor deposition or chemical vapor deposition before forming the plurality of holes or grooves.

12. The method according to claim 11, further comprising:
depositing a mask layer on the stacked structure after forming the stacked structure and before forming the plurality of holes or grooves.

13. The method according to claim 12, wherein the mask layer comprises a metal, a polymer or a dielectric material.

14. The method according to claim 13, wherein the metal is gold or chromium.

15. The method according to claim 13, wherein the polymer is poly(methyl methacrylate) or photoresist.

16. The method according to claim 13, wherein the dielectric material is silicon oxide ($SiO_2$) or aluminum oxide ($Al_2O_3$).

17. The method according to claim 12, wherein the plurality of holes or grooves are formed by etching through the mask layer.

18. The method according to claim 17, wherein the etching is focused ion beam (FIB) etching, plasma etching, or reactive ion etching.

19. The method according to claim 17, further comprising:
removing the mask layer from the stacked structure after forming the plurality of holes or grooves on the stacked structure.

* * * * *